United States Patent [19]

Boeniger

[11] Patent Number: 4,733,617
[45] Date of Patent: Mar. 29, 1988

[54] DRIVING DEVICE FOR RAIL VEHICLES HAVING FRICTION AND COG DRIVES

[75] Inventor: Hanspeter Boeniger, Widen, Switzerland

[73] Assignee: Georg Utz AG., Bremgarten, Switzerland

[21] Appl. No.: 771,032

[22] Filed: Aug. 30, 1985

[30] Foreign Application Priority Data

Sep. 4, 1984 [CH] Switzerland .................. 04210/84

[51] Int. Cl.$^4$ .................... A63H 19/02; B61C 15/02
[52] U.S. Cl. .................... 105/29.2; 105/29.1; 105/157.2; 105/119
[58] Field of Search ............ 105/29 TL, 29 R, 97, 105/117–122, 157 T, 29.1, 29.2, 157.2; 446/462, 463; 384/129, 420, 425, 440

[56] References Cited

U.S. PATENT DOCUMENTS

| 364,881 | 6/1887 | Wood | 105/119 |
|---|---|---|---|
| 3,918,198 | 11/1975 | Cheng et al. | 105/157 T X |
| 3,942,389 | 3/1976 | Jung | 74/425 X |
| 4,067,260 | 1/1978 | Finsterwald | 105/29 R |
| 4,468,884 | 9/1984 | Goldfarb et al. | 446/462 |
| 4,547,166 | 10/1985 | Goldfarb et al. | 446/462 X |

FOREIGN PATENT DOCUMENTS

| 0771074 | 9/1934 | France | 105/119 |
|---|---|---|---|
| 0072908 | 6/1980 | Japan | 384/425 |
| 0185022 | 6/1936 | Switzerland | 105/29 R |
| 0619594 | 3/1949 | United Kingdom | 384/425 |
| 0945483 | 1/1964 | United Kingdom | 105/157 T |

Primary Examiner—Robert B. Reeves
Assistant Examiner—Scott H. Werny
Attorney, Agent, or Firm—Edmund M. Jaskiewicz

[57] ABSTRACT

A driving device for rail vehicles having both a friction drive and a cog gear drive has a common drive shaft placed in the longitudinal direction of the rail vehicle. The drive shaft is provided with driving worms which mesh with worm gears on the driving axles of the friction drive and the cog gear drive. The worms are axially spaced on the drive shaft and engage the respective drive gears of the friction and cog gear drives which are located under the drive motor so as to obtain greater traction force with the friction drive and a more positive meshing of the cog gear with the rack.

21 Claims, 4 Drawing Figures

DRIVING DEVICE FOR RAIL VEHICLES HAVING FRICTION AND COG DRIVES

The present invention relates to the driving mechanism for rail vehicles, more particularly, to such a drive mechanism in which a drive motor on the vehicle can be drivingly connected with a friction rail drive and a cog gear drive.

In addition to the large number of known cog wheel or rack railroads having steam locomotives, steam rail cars, electric locomotives and rail cars, as well as rail vehicles with internal combustion engines, those railroads having mixed cog wheel and friction rail sections include the largest portion of all cog wheel rail vehicles which have been constructed.

There is a particularly great diversity in the constructions of rack steam locomotives which range from a two-axle locomotive with a coupled driving mechanism and one driving cog wheel to multi-axle locomotives having four-axle friction trucks and a separate three-axle cog gear truck. The present invention is primarily concerned with that type of drive wherein power units have coupled driving mechanisms, such as those with disconnectible rail friction drives and power units having separate driving mechanisms. With respect to the types of drives, reference is made to the publication "Zahnradbahnen der Welt" [Rack Railroads of the World]by Walter Hefti.

It is to be noted that in the case of coupled rail friction and cog gear drives, the gear transmission ratios between the drive motor and the drive axle or the friction drive on the one hand and the drive motor and driving pinion for the cog wheel on the other hand are the same size.

Coupled driving mechanisms were used, for example, with electrification of the Visp-Zermatt line, in the locomotives of the Furka-Oberalp line and in the mountain locomotives of the Bruenig lines.

The freight locomotives on the Martigny-Chatelard line which were first placed into operation in 1905 used two drive motors mounted on the frame which drove the two driving pinions of the cog wheels through double gear transmissions. The axles of the driving pinions were provided with crank arms from which the friction drive was produced through four connecting rods. Since each driving pinion was driven by a separate motor, balancing of the gear tooth pressure was also resolved.

The rail cars of the Bex-Villars-Bretaye line which were put into operation in 1940 employed a driving mechanism installed in a truck. A drive motor mounted on the frame along the longitudinal axis of the rail car was connected by a friction clutch to an intermediate gear from whose drive shaft a carden shaft transmitted the torque to the axle drive. A bevel gear, whose secondary shaft carried the two pinions for both the cog and friction drives, was mounted on the axle drive as a first transmission. These pinions meshed with the gears, one of which was connected to the driving pinion for the cog and the other was press fitted on the axle for the friction drive.

Coupled driving mechanisms were used primarily on railroad lines having relatively small capacities and only short rack distances. The known disadvantages of coupled driving mechanisms could be compensated by a relatively simple construction in which the driving pinion is press fitted directly onto one friction axle. However, this construction can be employed only in the case of model railroads and not in public rail transportation. Presumably, this construction was not employed because the pitch line of the rack and the upper rail surface would have had to be at the same height which would then present difficulties in the cog wheel with the crown line when switching to friction rail stretches.

Driving mechanisms having disconnectible friction drives were employed only in those railroad lines which had a relatively short friction section serving as an access stretch to a relatively long and continuous rack stretch. Thus, for example, the rail cars on the Aigle-Leysin line are made according to the same concept as the rail cars used on the Bex-Villars-Bretaye line discussed above except for the difference that the drive gear for the friction or adhesion drive is not pressed onto the drive axle, but that this axle is driven by an oil clutch located inside of the drive device. After descent of the rail car onto the rack, the driving motor for the oil pump is cut off and thus the oil under pressure, which produces the nonpositive connection between the ring gear and hub, is discharged. The friction drive is thus engaged.

In addition to the safety requirements that a rack must be so constructed that the cog wheel is never completely disengaged from the rack and the rack must have a safety factor of at least six with respect to a prescribed maximum train weight, rack locomotives were equipped with additional safety features in addition to those safety features commonly found on rail friction locomotives. For example, each such locomotive had to be provided with several special brake devices which act both on the gear and friction drives.

It is therefore the principal object of the present invention to provide a novel and improved driving mechanism for rail vehicles having both rail friction and cog wheel drives.

It is another object of the present invention to provide such a driving mechanism which is simple in construction, reliable in operation over long periods of time and requires a minimum of maintenance while providing a high degree of functionality.

It is a further object of the present invention to provide such a driving mechanism which is relatively low in cost and which can readily be incorporated in model rail vehicles.

The objects of the present invention are achieved by providing a drive shaft extending in the longitudinal direction of the rail vehicle and the drive shaft is drivingly connected with gears of angular gear drives with one such angular gear drive having a gear fixed on a driving axle for the friction drive and another angular gear having a gear fixed on the drive axle of the cog wheel. The resulting structure is relatively simple with a minimum of structural details, is characterized by a compact construction which can be incorporated in relatively narrow and limited space conditions and provides for optimum operating features.

According to one aspect of the present invention, there may be provided a drive device for a rail vehicle having both friction and cog drives wherein a drive shaft is drivingly connected to a drive motor and disposed in the longitudinal direction of the vehicle. The friction drive has a friction drive gear fixed on a friction drive axle and the cog drive has a cog drive gear fixed on a cog drive axle. The drive shaft is positioned above both the drive axles. A plurality of angular gear drives drivingly connect the drive shaft with the friction and cog drive gears respectively.

While not so limited, the present invention is particularly adapted to locomotives having electric drive motors and operating on gages narrower than the usual standard gage. Further, the construction of the present invention is relatively simple so that the manufacturer of model rail vehicles can faithfully reproduce this drive mechanism at reasonable cost and still obtain favorable operating characteristics.

While the prior art constructions as described previously are purely mechanical drive systems which have proven themselves over several decades and only recently are being replaced by other systems, these prior art systems can be manufactured only at considerable costs and are relatively difficult to transfer to model rail vehicles at reasonable costs.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment and modifications of the present invention will be described in detail.

Figure 1:
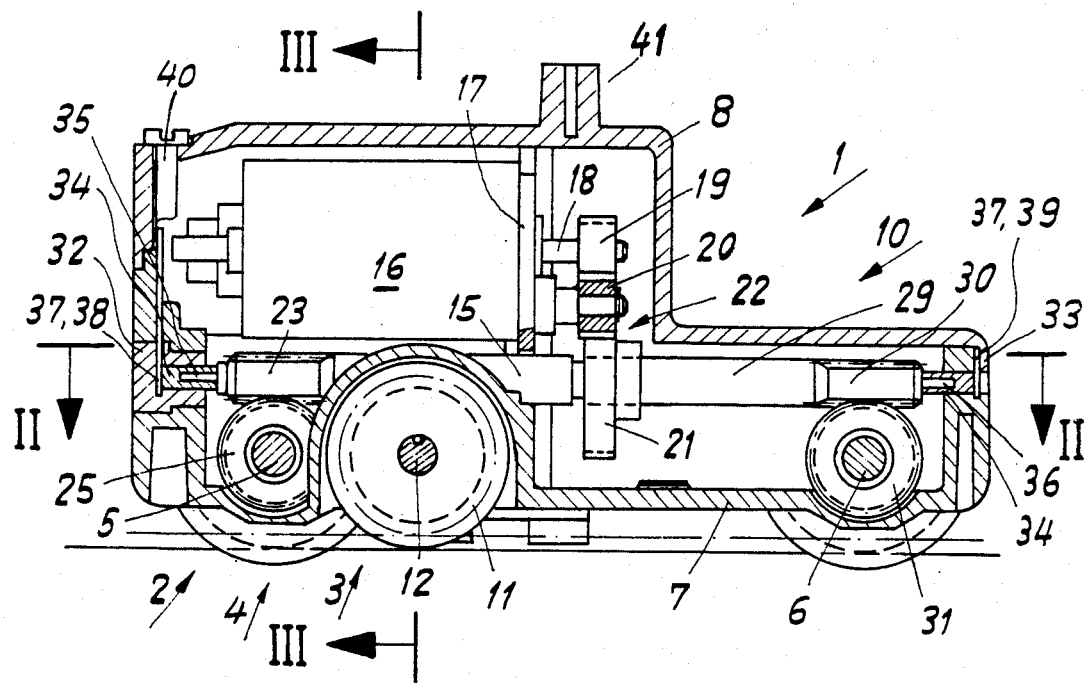
FIG. 1 is a longitudinal sectional view through a rail vehicle incorporating the drive device of the present invention and taken along the line I—I of FIG. 2.
Figure 2:
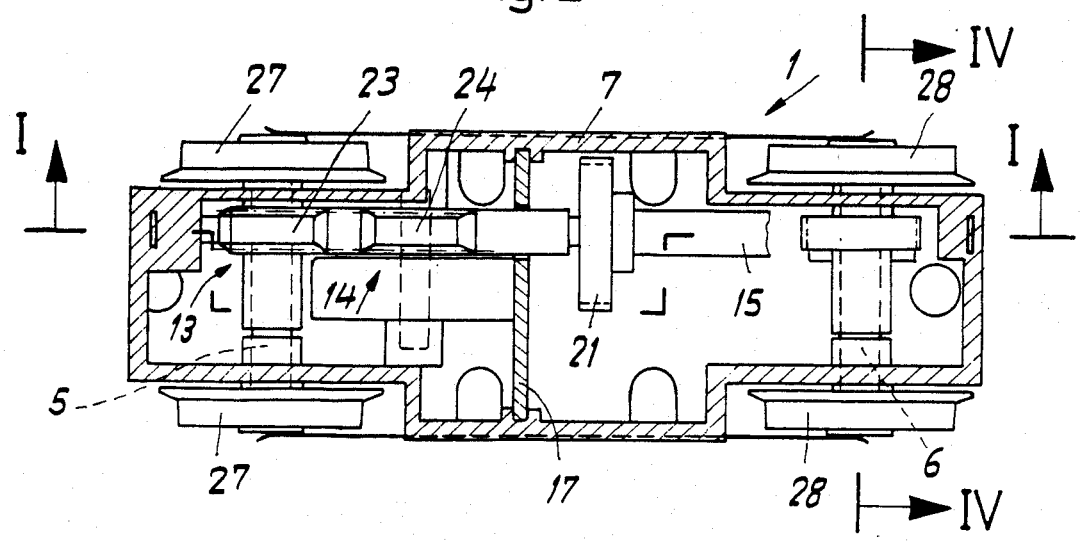
FIG. 2 is a sectional view taken along the line II—II of FIG. 1.

In FIGS. 1 and 2, there is indicated generally at 1 a truck of an electrically driven locomotive which has a driving mechanism indicated generally at 4 comprising a rail friction or adhesive drive indicated generally at 2 and a cog gear drive indicated generally at 3. The truck 1 has a truck housing 10 comprising a lower truck housing portion 7 and an upper truck housing portion 8, both of which are detachable from each other. Drive axles 5 and 6 of the friction drive are mounted in the lower housing portion 7 together with drive axle 12 upon which is fixed a driving pinion of cog gear 11 which is engageable with a rack positioned substantially between the rails upon which the locomotive operates. Angular gear drives 13 and 14 drivingly connect drive axles 5 and 12 with a common drive shaft 15 which extends in the longitudinal direction of the vehicle and is positioned above these drive axles. The drive shaft 15 is drivingly connected with a drive motor 16 which is mounted on a substantially vertically disposed carrier plate 17 in the upper housing portion 8. The drive motor 16 has a drive shaft 18 extending directly therefrom and a pinion gear 19 is mounted on the drive shaft 18. The pinion gear 19 engages an idler gear 20 which is mounted on the carrier plate 17 and is freely rotatable. The idler gear 22 in turn meshes with a driving pinion 21 fixedly mounted on the drive shaft 15. The gears 19, 20 and 21 thus form a back gear or gear transmission 22.

The angular gear drives 13 and 14 illustrated in the drawings are worm drives which are particularly suitable for the present embodiment. However, bevel gear or bevel gear-worm drives could also be used but such drives may be somewhat more expensive in construction.

In the worm drives of the present embodiment, the drive shaft 15 which is laterally offset from the longitudinal center line of the rail vehicle and is mounted in the lower truck housing 7 is provided with two axially spaced driving worms 23 and 24 which mesh with bevel gears 25 and 26 which are respectively fixed upon driving axle 5 and drive axle 12 of the cog gear. The worm gear and worm construction provides for high efficiency of the transmission of power and a virtually noiseless operation.

Because the rack which projects above the upper surface of the rails and both the friction and cog drives are driven by a common drive shaft, the pitch diameter of the driving pinion 11 for the cog drive is smaller than the pitch diameter of the drive gears 25 and 26 on the drive axles 5 and 6 for the friction drive. Thus, in order to obtain the same speed of the drive wheels and driving pinion 11 along its pitch line from the angular worm drives 13 and 14, there must be a gear reduction which corresponds to the ratio of the diameters of the drive wheels 27 and 28 and pitch diameter of the driving pinion 11. Accordingly, the reduction in the worm drives for the drive wheels 27 and 28 on the drive axles 5 and 6 with respect to the diameters is less than the reduction for the driving pinion 11. The drive axle 12 of the driving pinion 11 is located in the plane formed by the drive axles 5 and 6. The pitch diameters of the driving worms 23 and 24 are equal. It is necessary that the effective height of the teeth on the rack project above the upper edges of the rail because of the presence of switches installed on rack railroads. Because of the existence of the middle rail of the switches, the cog gear of the cog drive must have its crown line raised above the upper edge of the middle rail by a short distance so that the cog wheel can readily pass over the switch rails without contact.

Since both the drive wheels of the friction drive and the cog gear of the cog drive should have the same peripheral speed on the rails and rack respectively, it is apparent that the structure according to the present invention enables this characteristic to be achieved. This means that the reduction in the worm gear for the friction drive is less than the reduction in the worm gear for the cog drive. It has also been found that for manufacturing purposes it is advantageous when the drive axle of the cog gear is at least substantially in the same plane which is defined by the drive axles of the drive wheels of the friction drive. To further simplify production the driving worms on the drive shaft have the same pitch diameter. These driving worms 23 and 24 on the drive shaft 15 are self-locking so that in the case of steep rack sections the running speed can be controlled by the motor propulsion power. At the same time, the rail vehicle will hold its position during a stop by making an ascent because of the self-locking feature without the necessity for additional braking.

In order to improve efficiency, the driving worms 23 and 24 are made multi-threaded or double threaded. The lateral offsetting of the drive shaft with respect to the longitudinal center line of the rail vehicle results in a more compact construction.

Adhesion of the drive wheels 27 and 28 with respect to the rails and engagement of the cog gear 11 in the rack is improved by positioning the drive motor 16 over the drive axle 5 and drive axle 12. The weight of the motor thus improves the friction drive and engagement between the cog gear and the rack.

A coupling device may be provided on drive shaft 15 between the drive worms 23 and 24 in order to uncouple the friction drive from the gear drive. The back or transmission gear system 22 is provided on the end of the drive shaft 15 which is opposite the end of the drive shaft intended for the friction and cog drive. Subsequently, a second bearing of the drive shaft 15 could be mounted directly onto the driving pinion 21 in the case where the friction drive is produced only on one drive axle 5. Since in the present embodiment both axles 5 and 6 are driven, the drive shaft 15 is provided with a shaft extension 29. On the end of the shaft extension 29 or somewhat before its bearing, there is provided a drive worm 30 which corresponds to the structure of the other drive worm 23 for the friction drive. The drive worm 30 meshes with bevel gear 31 which is fixed to the drive axle 6. It is apparent that the drive shaft 15 can be mounted in the same manner but without any drive to the drive axle 6. However, the present embodiment of a two-axle drivable truck is a preferred construction.

In the truck or rail vehicle of the present invention as illustrated in FIG. 1, it is preferable that drive axle 5 function as the rear running axle of the truck. Accordingly, it is further preferable that the cog gear 11 be positioned adjacent to or at least close in the vicinity of the running axle 5 so as to be directly under the driving motor 16 and thus the cog gear is further offset from the running axle 6 functioning as the front axle of the rail vehicle.

In the rear wall of the lower truck housing portion 7 there is detachably fastened a bearing block 32 which supports a bushing 34 in which is journaled an end 35 of the drive shaft 15. In a similar manner, bearing block 33 is mounted in the opposed front wall to support a sleeve bearing or bushing 34 in which is journaled the other end 36 of the drive shaft 15. In order to limit axial displacement of the drive shaft 15 stop plates 38 and 39 are slid downwardly into vertically extending slots 37 formed in opposed ends of the lower truck housing portion 7. One stop plate 38 may function to secure the bearing block 32 in position. This mounting of the drive shaft facilitates a removal and installation of the entire driving mechanism and can also be employed for a pure friction drive without any cog drive.

It is preferable that the separation line of the truck housing 10 into the upper and lower portions 7 and 8 occur immediately above the bearing blocks as shown in FIG. 1. However, it would also be possible to separate the housing along a line below the bearing blocks of the drive shaft 15. However, because of the precise engagement ratios in the angular gear drives 13 and 14, it is preferable that the separation line be above the bearing blocks as illustrated.

The truck housing 10 hermetically encloses the driving mechanism 4 of the friction and cog drive and therefore offers protection from dirt and foreign objects and against the loss of lubricant. Such a construction is particularly useful for model rail vehicles wherein the upper and lower housing portions 7 and 8 are secured by screws 40 one of which is shown in FIG. 1.

An upwardly projecting bearing plate 41 is mounted on the upper housing portion 8 along its longitudinal center line to provide for mounting of the truck pin center plate of the truck 1 on a rail vehicle. The rigidity and strength of the truck housing facilitates this pivotal mounting of the truck.

If the rail vehicle is intended to run only on flat stretches of track, the gear drive can be removed from the drive mechanism or even eliminated from the drive mechanism. In addition, the operating speed of the vehicle can be modified by interchanging the gears of the gear transmission 22 for other gears providing a desired drive ratio.

Figure 3:
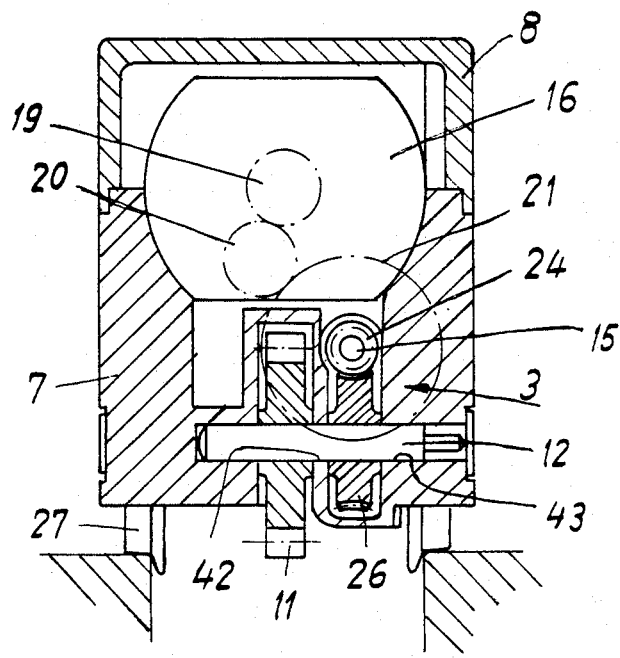
FIG. 3 is a transverse sectional view taken along the line III—III of FIG. 1.

The cog gear drive 3 and the arrangement and relationship of the individual components as mounted in truck housing 10 are shown in FIG. 3. The housing 10 and the bevel gears and the cog gear 11 may be molded from suitable plastics but the entire rail vehicle may also be made from metal materials. The gears 11 and 26 are press fitted on the drive axle 12 or may be secured to the axle in another known manner such as by keys.

Figure 4:
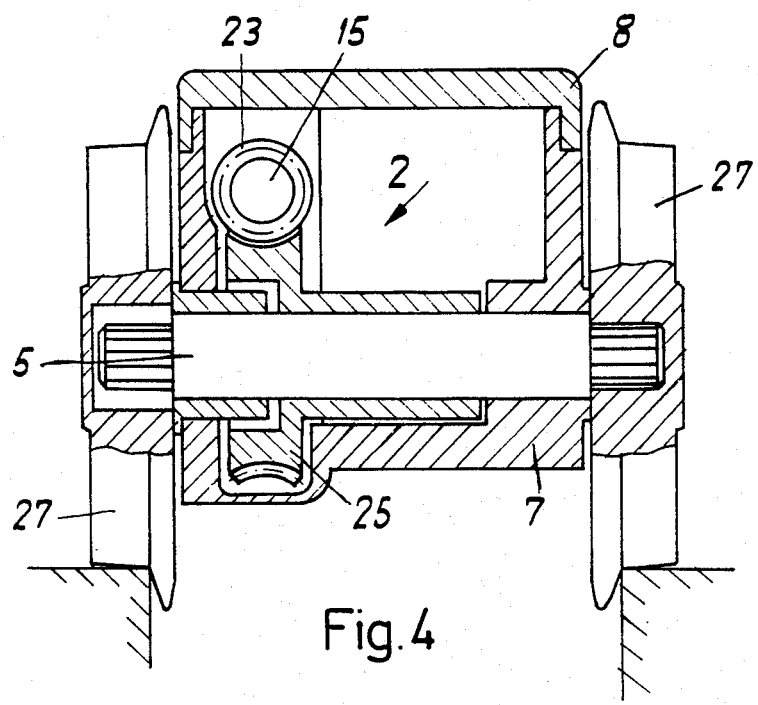
FIG. 4 is a transverse sectional view taken along the line IV—IV of FIG. 2.

The friction drive 2 in truck housing 10 is shown in FIG. 4.

It is pointed out that the disclosed embodiment can be employed to produce rail vehicles of this type also without a cog gear drive or may be constructed so as to be subsequently provided with a cog gear drive at a later time. If a vehicle is produced without the cog gear drive, then the bearing passages 42 and 43 of the drive shaft 12 may be sealed with a suitable sealant which is not shown in greater detail but which can be inserted from the exterior of the housing. At the same time, the several gears comprising the back gear 22 may be interchanged with other gears so as to obtain a higher running speed.

Thus it can be seen that the present invention has disclosed a simple but reliable drive mechanism for a rail vehicle having both a friction drive and a cog wheel drive. The disclosed driving mechanism may be incorporated either on full size rail vehicles or on model rail vehicles. The simplicity of the structure greatly facilitates the adaptation of the drive system for model rail vehicles. The drive mechanism is extremely compact but will function reliably over long periods of time.

It will be understood that this invention is susceptible to modification in order to adapt it to different usages and conditions, and accordingly, it is desired to comprehend such modifications within this invention as may fall within the scope of the appended claims.

What is claimed is:

1. In a drive device for a rail vehicle having both friction and cog drives and supported on drive wheels, a single drive shaft drivingly connected to a drive motor and disposed in the longitudinal direction of the vehicle, a plurality of friction drive axles for said friction drive and a friction drive gear fixed on each said friction drive axle, a cog drive axle for said cog drive and a cog drive gear fixed on said cog drive axle, said drive wheels mounted only on said friction drive axles, said drive shaft being above and extending over all of said friction and cog drive axles and underneath said drive motor, and a plurality of angular gear drives drivingly connecting said drive shaft with said friction and cog drive gears.

2. In a drive device as claimed in claim 1 wherein said angular gear drives comprise bevel gear drives.

3. In a drive device as claimed in claim 1 wherein said angular gear drives comprise worm-bevel gear drives.

4. In a drive device as claimed in claim 1 wherein said friction and cog drive gears comprise worm gears each meshing with worms on said drive shaft of said angular gear drives.

5. In a drive device as claimed in claim 4 wherein the reduction of the worm for said friction drive axle with respect to the diameter of a drive wheel of said friction drive and of the pitch line of a cog gear on said cog drive is less than the reduction of the worm for said cog drive axle.

6. In a drive device as claimed in claim 4 wherein said driving worms on said drive shaft have the same pitch diameter.

7. In a drive device as claimed in claim 4 wherein said driving worms are multi-threaded.

8. In a drive device as claimed in claim 1 wherein said friction drive has a plurality of drive axles, the cog drive axle of said cog drive being in a plane defined by said plurality of drive axles of said friction drive.

9. In a drive device as claimed in claim 1 wherein said angular gear drives are self-locking.

10. In a drive device as claimed in claim 1 wherein said drive shaft is laterally offset with respect to the central longitudinal plane of the rail vehicle.

11. In a drive device as claimed in claim 1 wherein said drive motor is disposed over said friction drive axle and a drive cog gear of said cog drive, said cog gear being substantially centrally disposed between the rails.

12. In a drive device as claimed in claim 1 and further comprising a transmission gear system comprising at least two gears drivingly connecting said drive shaft and said drive motor.

13. In a drive device as claimed in claim 12 wherein said drive shaft has one end drivingly connected to said friction and cog drives and another end connected by said transmission gear system to said drive motor.

14. In a drive device as claimed in claim 12 wherein said cog drive is removable from the vehicle, the gears of said transmission gear system being interchangable with other gears to vary the running speed of the vehicle.

15. In a drive device as claimed in claim 1 and further comprising means for disconnecting said friction and cog drives from each other.

16. In a drive device as claimed in claim 1 wherein one of said friction drive axle defines a rear drive axle and the cog gear of said cog drive being disposed adjacent said rear drive axle.

17. In a drive device as claimed in claim 1 wherein the rail vehicle comprises a multi-axle truck housing, said truck housing comprising upper and lower detachable portions, said drive shaft being disposed in said lower housing portion.

18. In a drive device as claimed in claim 17 and further comprising a bearing block mounted in said lower truck housing portion and one end of said drive shaft being journaled in said bearing block.

19. In a drive device as claimed in claim 18 wherein said lower truck housing portion has two ends and there being a vertical slot in each of said two ends opposed from the ends of said drive shaft, and stop plates within said slots and engageable at the ends of said drive shaft to limit axial displacement thereof.

20. In a drive device as claimed in claim 17 wherein said truck housing hermetically encloses the drive device.

21. In a drive device as claimed in claim 17 and further comprising a bearing plate on the upper surface of said upper truck housing portion and along the central longitudinal plane thereof to define a pivot mount for the rail vehicle.

* * * * *